J. STIRK.
Running-Gear for Vehicles.

No. 159,528.            Patented Feb. 9, 1875.

WITNESSES
W. B. Wiley
Jacob Stauffer

INVENTOR
Jacob Stirk

UNITED STATES PATENT OFFICE.

JACOB STIRK, OF LANCASTER TOWNSHIP, (CITY P. O.,) LANCASTER COUNTY, PENNSYLVANIA.

IMPROVEMENT IN RUNNING-GEARS FOR VEHICLES.

Specification forming part of Letters Patent No. 159,528, dated February 9, 1875; application filed November 13, 1874.

*To all whom it may concern:*

Be it known that I, JACOB STIRK, of Lancaster township, in the county of Lancaster and State of Pennsylvania, have invented certain new and useful Improvements in the Running-Gear of Vehicles; and I do hereby declare that the following is a full and correct description of my invention, which will enable others skilled in the art to which it pertains to make and use it, reference being had to the accompanying drawing, which forms a part of this specification, and in which—

Figure 1:
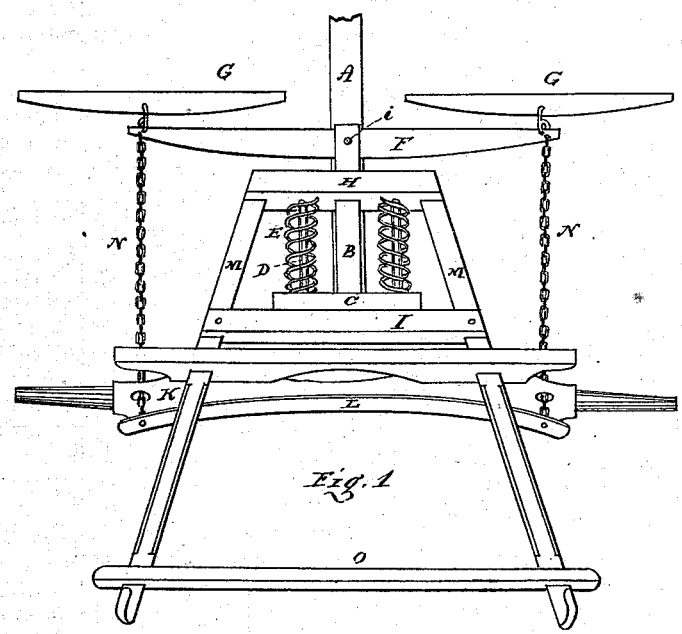
Figure 2:
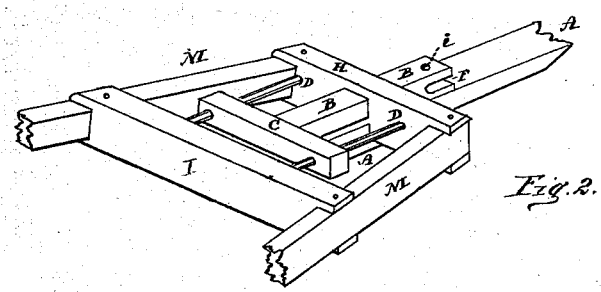

Figure 1 represents a plan view, partially in perspective; and Fig. 2 is a perspective view of a portion of the improvement represented in Fig. 1.

Similar letters of reference indicate corresponding parts in both figures.

This invention consists in the combination and arrangement of springs with the double-tree and forward axle of a vehicle, substantially as and for the purpose hereinafter set forth.

The hounds M are framed into two cross-pieces, H and I, placed forward of the axle K. Through a central opening in the cross-piece H the coupling-stem B slides in and out. This coupling-stem B is firmly secured to a cross-head or block, C, at right angles, and the ends of the latter are perforated so as to enable the block C to slide upon the two fixed rods D. The ends of the rods D are framed or mortised into the two cross-pieces H and I, parallel to the coupling-stem B, as shown. Two strong coiled springs, E, (removed in Fig. 2,) are placed upon the rods D, between the cross-piece H and the sliding block C, so as to act against them severally. The central sliding coupling-stem B is secured to the double-tree F by a pin, $i$, and the tongue or pole A is secured to the under side of the two fixed cross-pieces H and I, independent of the coupling-stem B and sliding block C. L is a semi-elliptical spring, firmly secured by its middle to the middle of the hinder side of the axle K, and extending backward to each side, so as to reach, nearly, the step of each spindle. Each end of this spring is connected by a stay-chain, N, to the corresponding ends of the double-tree F.

By this combination of the springs E and L with the double-tree F, to which the whiffle-trees G are attached, I gain an important advantage over similar devices which have only one set of springs. In starting the team, the horses pull on the spring-yoke B C by its direct connection with the double-tree F, the coiled springs E yielding gradually until the start is made, thereby obviating the usual dead-pull or straining of the team to overcome the inertia. At the same time, the spring L acts as a draft-equalizer, as tending to even the pull on both ends of the double-tree F. When either of the forward wheels strike a rut or stone the sudden jerk or shock is broken by the spring L, which is placed behind the axle, and not in front of this, as usual. By the arrangement of the spring L in combination with the spring-yoke B C, as hereinbefore described, a smooth and easy motion of the vehicle is obtained, and the strain on the team in starting, or when traveling over rough ground, is greatly lessened.

I am aware that semi-elliptical springs have before been used; but they have invariably been placed in front of the front axle, and not behind it, so as to cushion the pull upon the axle, and soften the shock upon the axle when the wheel strikes an obstruction.

Having thus described my invention, I claim and desire to secure by Letters Patent—

1. The combination of sliding yoke B C, springs E, and guide-rods D, substantially as and for the purpose set forth.

2. The combination of sliding yoke B C, springs E, guide-rods D, semi-elliptical spring L, stay-chains N, and double-tree F, substantially as and for the purpose set forth.

JACOB STIRK.

Witnesses:
W. B. WILEY,
JACOB STAUFFER.